(12) United States Patent
Merz et al.

(10) Patent No.: US 10,942,141 B2
(45) Date of Patent: Mar. 9, 2021

(54) MULTI-PARAMETRIC SENSOR WITH BRIDGE STRUCTURE

(71) Applicant: SENSIRION AG, Stäfa (CH)

(72) Inventors: Matthias Merz, Stäfa (CH); Mark Hornung, Stäfa (CH); Felix Hoehne, Stäfa (CH)

(73) Assignee: SENSIRION AG, Stafa (CH)

( * ) Notice: Subject to any disclaimer, the term of this patent is extended or adjusted under 35 U.S.C. 154(b) by 169 days.

(21) Appl. No.: 16/346,205

(22) PCT Filed: Oct. 30, 2017

(86) PCT No.: PCT/EP2017/077806
§ 371 (c)(1),
(2) Date: Apr. 30, 2019

(87) PCT Pub. No.: WO2018/078165
PCT Pub. Date: May 3, 2018

(65) Prior Publication Data
US 2019/0293590 A1 Sep. 26, 2019

(30) Foreign Application Priority Data
Oct. 31, 2016 (EP) .................................... 16196586

(51) Int. Cl.
*G01N 27/18* (2006.01)
*G01N 27/12* (2006.01)
*H05B 3/22* (2006.01)

(52) U.S. Cl.
CPC ........... *G01N 27/18* (2013.01); *G01N 27/121* (2013.01); *G01N 27/123* (2013.01); *G01N 27/128* (2013.01); *H05B 3/22* (2013.01)

(58) Field of Classification Search
CPC .... G01N 27/18; G01N 27/121; G01N 27/123; G01N 27/128; H05B 3/22
See application file for complete search history.

(56) References Cited

U.S. PATENT DOCUMENTS

| | | | | |
|---|---|---|---|---|
| 4,226,112 A | * | 10/1980 | Jibelian | G01N 27/18 73/23.25 |
| 4,369,647 A | * | 1/1983 | Shigemori | G01M 3/16 340/634 |

(Continued)

FOREIGN PATENT DOCUMENTS

| | | |
|---|---|---|
| EP | 2 278 308 A1 | 1/2011 |
| EP | 2 778 667 A1 | 9/2014 |
| EP | 2 952 885 A1 | 12/2015 |

OTHER PUBLICATIONS

International Sealch Report in International Application No. PCT/EP2017/077806.

(Continued)

*Primary Examiner* — David J Bolduc
(74) *Attorney, Agent, or Firm* — Ladas & Parry LLP

(57) ABSTRACT

The disclosure relates to a sensor for detecting and/or analysing a gas. The sensor comprises a substrate, a recess or opening arranged in the substrate, a first bridge structure and a second bridge structure. The first bridge structure and the second bridge structure extend over said recess or opening and are anchored in the substrate. The first bridge structure forms a first hotplate and comprises a first patch of sensing material, in particular of a metal oxide material, arranged on the first hotplate, electrodes adapted to measure an electrical property of the first patch and a heater adapted to heat the first hotplate. The second bridge structure comprises a temperature sensor. The sensor comprises circuitry for driving the heater and for processing signals from the electrodes and the temperature sensor. The sensor provides a first operation mode configured to perform a measurement of an electrical property of the first patch and a second operation mode configured to operate the second bridge structure in a sensing mode to perform a measurement of a thermal property of the gas. The thermal property is a (Continued)

thermal capacity and/or a thermal conductivity and/or a thermal diffusivity of the gas.

26 Claims, 7 Drawing Sheets

(56) References Cited

U.S. PATENT DOCUMENTS

| | | | | |
|---|---|---|---|---|
| 4,624,137 | A * | 11/1986 | Johnson | H01L 27/16 257/E27.008 |
| 4,706,061 | A * | 11/1987 | Johnson | G01N 27/18 257/419 |
| 4,793,181 | A * | 12/1988 | Djorup | G01N 27/121 73/29.02 |
| 4,847,783 | A * | 7/1989 | Grace | G01N 27/123 702/24 |
| 5,019,885 | A | 5/1991 | Yagawara et al. | |
| 5,345,213 | A * | 9/1994 | Semancik | B01L 7/54 257/253 |
| 5,356,756 | A * | 10/1994 | Cavicchi | G01N 27/18 204/192.12 |
| 5,377,527 | A * | 1/1995 | Kamiunten | G01N 27/18 73/25.03 |
| 5,464,966 | A * | 11/1995 | Gaitan | B01L 7/00 219/544 |
| 6,161,421 | A * | 12/2000 | Fang | G01N 27/128 338/34 |
| 6,204,083 | B1 * | 3/2001 | Kodato | G01J 3/108 438/43 |
| 6,690,569 | B1 | 2/2004 | Mayer et al. | |
| 7,441,440 | B2 * | 10/2008 | Sberveglieri | G01N 27/12 73/31.06 |
| 7,704,774 | B2 | 4/2010 | Mayer et al. | |
| 7,963,147 | B2 * | 6/2011 | Jun | G01N 27/128 73/31.06 |
| 10,330,624 | B2 * | 6/2019 | Tayebi | G01N 27/124 |
| 10,803,382 | B2 * | 10/2020 | Tayebi | G01N 33/0047 |
| 10,859,523 | B2 * | 12/2020 | Yamashita | G01N 27/407 |
| 2005/0066707 | A1 * | 3/2005 | Katsuki | G01N 33/005 73/23.21 |
| 2009/0151429 | A1 * | 6/2009 | Jun | G01N 33/0027 73/31.06 |
| 2009/0239371 | A1 * | 9/2009 | Mayer | C23C 16/407 438/608 |
| 2009/0277246 | A1 * | 11/2009 | Ooishi | G01N 33/225 73/25.03 |
| 2010/0060465 | A1 * | 3/2010 | Stetter | B81B 3/0021 340/584 |
| 2011/0174799 | A1 | 7/2011 | Ali et al. | |
| 2012/0161253 | A1 * | 6/2012 | Hsieh | B81C 1/00182 257/414 |
| 2013/0042669 | A1 * | 2/2013 | Humbert | G01N 27/128 73/31.06 |
| 2014/0208828 | A1 * | 7/2014 | Von Waldkirch | G01N 33/0031 73/25.05 |
| 2014/0208830 | A1 | 7/2014 | Buhler et al. | |
| 2015/0201463 | A1 * | 7/2015 | Madani | H05B 3/22 204/192.15 |
| 2016/0018356 | A1 * | 1/2016 | Shankar | G01N 27/12 205/775 |
| 2017/0016840 | A1 * | 1/2017 | Bourlon | G01N 27/18 |
| 2017/0097314 | A1 * | 4/2017 | Christenson | B81B 7/02 |
| 2017/0131252 | A1 * | 5/2017 | Ahn | H05B 3/26 |
| 2017/0205368 | A1 * | 7/2017 | Liu | G01N 27/046 |
| 2017/0316995 | A1 * | 11/2017 | Hwang | G01N 27/123 |
| 2017/0363589 | A1 * | 12/2017 | Kumar | G01N 27/18 |
| 2018/0007740 | A1 * | 1/2018 | Ahn | H05B 3/26 |
| 2018/0045663 | A1 * | 2/2018 | Ahn | G01N 33/0031 |
| 2018/0045664 | A1 * | 2/2018 | Ahn | G01N 27/128 |
| 2018/0052124 | A1 * | 2/2018 | Rogers | G01N 29/022 |
| 2018/0292338 | A1 * | 10/2018 | Liu | G01N 27/18 |
| 2019/0086351 | A1 * | 3/2019 | Yamashita | G01N 27/18 |

OTHER PUBLICATIONS

Written Opinion of the Intelrnational Search Authority in International Application No. PCT/EP2017/077806.

G. Muller, et al.: "A MEMS toolkit for metal-oxide-based gas sensing systems", Thin Solid F, Elsevier, Amsterdam, NL, (Jul. 22, 2003), vol. 436, No. 1. DOI:10.1016/ S0040-6090(03) 00523-6, ISSN 0040-6090, pp. 34-45, XP004431389 [Y] 7,9,18,20 * figures 1a, 9 * * p. 35, col. left, lines 5-14 * * p. 38, col. left, line 41 * * paragraph [0005] * [A] * 22-26 DOI: http://dx.doi.org/10.1016/S0040-6090(03) 00523-6.

Kurt Kliche, "Integriertes Sensorsystem zur physikalischen Gasanalyse", HSG-IMIT, Institut fur Mikro-und Informationstechnik der Hahn-Schickard-Gesellschaft e.V., Abschlussbericht-Kurzfassung; Jul. 12, 2011, Project Nr. 313601, AiF-Nr. 16046 N.

* cited by examiner

First operation mode

MULTI-PARAMETRIC SENSOR WITH BRIDGE STRUCTURE

RELATED APPLICATION

This application is an application under 35 U.S.C. 371 of International Application No. PCT/EP2017/077806 filed on 30 Oct. 2017. This application claims priority from EP Patent Application No. 16196586.8 filed on 31 Oct. 2016, the contents of which should be understood to be incorporated herein by reference.

TECHNICAL FIELD

The invention relates to a sensor, in particular a gas sensor, comprising a recess or opening arranged in a substrate and a hotplate located over said recess or opening. A patch of sensing material, such as a metal oxide, is located on the hotplate, and electrodes for measuring an electrical property of the patch of sensing material are provided.

BACKGROUND ART

US 2014/0208830 describes a gas sensor having a membrane spanning an opening in a silicon substrate. The membrane forms a hotplate and has an integrated tungsten heater. In addition, a platinum layer, separated from the tungsten heater by a dielectric layer, forms electrodes for measuring the resistance of a patch of sensing material.

Müller G et al describe in "A MEMS toolkit for metal-oxide based gas sensing films", THIN SOLID FILMS, ELSEVIER, AMSTERDAM, NL, vol. 436, no. 1, 22 Jul. 2003, pages 34-45, a metal-oxide based gas sensing system. The gas sensing system comprises three or four silicon hotplates which are thermally isolated among themselves and may be operated at different temperatures.

U.S. Pat. No. 5,019,885 A describes a gas detecting device having a substrate and a plurality of gas sensitive elements supported by the substrate. A plurality of predetermined temperatures at which gases are detected are provided. The gas detecting device also includes a plurality of pairs of electrode leads supported by the substrate, each of the plurality of pairs of electrodes being connected to a corresponding one of the gas sensitive elements, and heater leads that are supported by the substrate and heat the plurality of gas sensitive elements so that each of the gas sensitive elements is set at a corresponding one of the plurality of predetermined temperatures.

EP 2778667 A1 discloses a gas sensor comprising a membrane with several sensing locations arranged thereon. At each sensing location a sensing material is provided that changes its resistivity in the presence of gaseous analytes. Electrodes are located on the membrane in electrical contact with the sensing material in order to measure a parameter indicative of the conductance of the sensing material. The sensing locations are heated by a heater assembly that is structured to generate different temperatures at the sensing locations, which allows to carry out measurements for different temperatures and to therefrom gain a better understanding of the analytes.

US 2011/0174799 A1 discloses a micro-hotplate in the form of a device comprising a sensor and one or more resistive heaters within the micro-hotplate arranged to heat the sensor. Furthermore a controller is provided for applying a bidirectional drive current to at least one of the heaters to reduce electromigration. The controller also serves to drive the heater at a substantially constant temperature.

It is an object of the present invention to provide a sensor with enhanced measurement capabilities.

DISCLOSURE OF THE INVENTION

According to an embodiment of a first aspect of the invention there is provided a sensor for detecting and/or analysing a gas. The sensor comprises a substrate, a recess or opening arranged in the substrate, a first bridge structure and a second bridge structure. The first and the second bridge structure extend over said recess or opening and are anchored in the substrate. The first bridge structure forms a first hotplate and comprises a first patch of sensing material, in particular of a metal oxide material, arranged on the first hotplate, electrodes adapted to measure an electrical property of the first patch and a heater adapted to heat the first hotplate. The second bridge structure comprises at least a temperature sensor. The sensor comprises circuitry for driving the heater and for processing signals from the electrodes and the temperature sensor. The sensor, in particular the circuitry, provides a first operation mode configured to perform a measurement of an electrical property of the first patch and a second operation mode configured to operate the second bridge structure in a sensing mode to perform a measurement of a thermal property of the gas. The thermal property is a thermal capacity and/or a thermal conductivity and/or a thermal diffusivity of the gas. According to embodiments, the electrical property may be the real and/or imaginary part of the electrical impedance of the first patch.

Such an embodied sensor allows the measurement of a plurality of parameters of the gas that shall be analysed. More particularly, it allows in the first operation mode the measurement of the electrical properties of the first patch that may change in dependence on the interaction of the first patch with the gas surrounding the first patch. On the other hand, the embodied sensor allows in the second operation mode the measurement of a thermal property of the gas. The results of both measurements can be used for a further analysis of the gas itself and/or environmental conditions of the gas such as the gas pressure.

According to embodiments, the circuitry may be in particular control circuitry and/or processing circuitry adapted to operate and control the sensor in the first operation mode and the second operation mode and to process signals from the measurements taken in the first operation mode and the second operation mode.

According to a preferred embodiment the second operation mode is configured to operate the first hotplate in a heating mode to heat the gas.

According to such an embodiment the first bridge structure is configured to provide different functions in the first operation mode and the second operation mode. In the first operation mode the first bridge structure is used to sense a change of an electrical property of the sensing material of the first patch depending on the composition of the respective surrounding gas. And in the second operation mode the first bridge structure is used as heating structure to provide a thermal heating of the surrounding gas, the result of which is measured by the temperature sensor of the second bridge structure. Hence, by providing a "double-functionality" to the first bridge structure, a dense integration can be facilitated. In particular, a sensor with both functionalities can be integrated on one single substrate and one single chip.

According to an embodiment, the second operation mode is configured to operate the first hotplate and/or a hotplate of a third bridge structure in a heating mode to heat the gas and to operate the second bridge structure in the sensing mode to measure a temperature change or one or more temperature parameters as a result of the heating of the first hotplate and/or the hotplate of the third bridge structure. Furthermore, the sensor is in the second operation mode configured to determine the thermal property of the gas from the temperature change and/or the temperature parameters.

According to such an embodiment the first hotplate and/or the third hotplate heat the surrounding gas. As a result, the temperature or a temperature signal at the second bridge structure changes. This temperature change depends on the thermal properties of the gas and may be used to determine the thermal properties of the gas. According to embodiments, a phase shift between a temperature signal of the first hotplate and a temperature signal of the second bridge structure may be measured e.g. as temperature parameter.

According to embodiments the first bridge structure comprises a temperature sensor.

According to a preferred embodiment the second bridge structure forms also a hotplate, namely a second hotplate, and comprises a second patch of sensing material, in particular of a metal oxide material, arranged on the second hotplate. Furthermore, the second bridge structure comprises electrodes adapted to measure an electrical property of the second patch and a heater adapted to heat the second hotplate. According to this embodiment the first operation mode is configured to perform a measurement of an electrical property of the first patch and the second patch.

According to such an embodiment also the second bridge structure is configured to provide different functions in the first operation mode and the second operation mode. In the first operation mode the second bridge structure is also used to sense a change of an electrical property of the sensing material of the second patch depending on the composition of the respective surrounding gas. According to some embodiments, the second patch may comprise a different sensing material than the first patch. According to other embodiments, the second patch may comprise the same sensing material, but it may be heated to a different temperature than the first patch. This enhances the parameters that can be measured in the first operation mode.

In the second operation mode the second bridge structure is used as sensing structure to sense or measure a thermal property of the gas, in particular to measure a temperature change caused by the heating of the first bridge structure. Hence, by providing a "double-functionality" to both the first bridge structure and the second bridge structure, a dense integration of a sensor that can measure a plurality of different parameters of the surrounding gas can be further facilitated.

According to a preferred embodiment the sensor comprises a third bridge structure comprising a hotplate and a heater. The second operation mode is configured to operate the hotplate of the third bridge structure in a heating mode to heat the gas.

According to such an embodiment the third bridge structure is used as heating structure to provide a thermal heating of the surrounding gas, the result of which is measured by the temperature sensor of the second bridge structure. According to some embodiments also both the first bridge structure and the third bridge structure may be used as heating structures in the second operation mode.

The substrate may be e.g. a silicon substrate, and it forms the mechanical frame of the sensor. It can optionally comprise circuitry integrated thereon, in particular CMOS circuitry, and more particularly CMOS circuitry adapted to control the heater and to read out the sensor.

By spanning the recess or opening only by means of the first and the second bridge structure, the thermal conductance between the hotplate and the substrate can be reduced compared with a thin film membrane. Further, the thermal mass can be reduced. This allows to vary the temperature of the first and the second hotplate quickly.

The respective heaters of the first and the second hotplate can be used for heating the hotplate to an operating temperature of the sensing material.

The electrodes are located for measuring an electrical property of the respective patch of sensing material, namely an electrical property depending on at least one gas analyte to be detected.

The temperature sensors are adapted to measure the temperature of the hotplates and/or the bridge structures, and their signal can be used for refining the measurement and/or for controlling the temperature of the hotplate/bridge structure. The temperature sensor may be embodied in various ways. According to one embodiment a resistive temperature sensor may be used. According to another embodiment a thermopile may be used. According to yet another embodiment the heater itself may be used as temperature sensor.

According to an embodiment the sensor is operable to perform in the second operation mode a measurement of a thermal capacity and/or a thermal conductivity and/or a thermal diffusivity of the gas.

According to this embodiment, the thermal capacity and/or the thermal conductivity and/or the thermal diffusivity of the gas are measured as thermal properties/thermal parameters of the gas. These properties/parameters can then be used for a further analysis of the gas and/or environmental conditions of the sensor.

According to an embodiment the sensor is configured to combine measurement results from the first operation mode and the second operation mode to determine the gas composition and/or the gas concentration.

According to such an embodiment the measurement of the thermal property is used as additional information in addition to the information derived from the measurement of the electrical property of the patch of sensing material to determine the gas composition and/or the gas concentration of the surrounding gas. This additional information may increase the accuracy, reliability and/or sensitivity of the sensor, in particular for gases that have a rather unique or characteristic thermal property. Furthermore, the analysis can be improved as the measurement results of the first operation mode and the second operation mode can be based on different physical principles.

According to another embodiment the sensor is operable to use measurement results of the second operation mode for determining a pressure of the gas.

For such a gas pressure measurement, the gas that surrounds the sensor should be known. According to embodiments the gas itself may be e.g. determined in the first operation mode and the gas pressure in the second operation mode.

If the gas surrounding the sensor is known, a thermal conductivity measurement may be used to determine the gas pressure as the thermal conductivity depends on the pressure of the respective gas.

According to a further embodiment the sensor is configured to perform in the first operation mode a continuous or pulsed heating of the first hotplate and/or the second hotplate and/or the hotplate of the third bridge structure.

According to a further embodiment the second operation mode comprises a static mode. In the static mode the sensor is configured to perform in the second operation mode a continuous heating of the first hotplate and/or the hotplate of the third bridge structure and a measurement of a temperature change of the second bridge structure.

In the static mode the sensor may be operated such that the thermal heat flow between the first hotplate and the second bridge structure reaches a steady state and/or such that the thermal heat flow between the hotplate of the third bridge structure and the second bridge structure reaches a steady state. The sensor may then measure the temperature change that is experienced at the second bridge structure in response to the heating of the first hotplate and/or in response to the heating of the hotplate of the third bridge structure. This temperature change is a measure of the thermal conductivity of the gas being present between the first hotplate and the hotplate of the third bridge structure respectively and the second bridge structure. The temperature change can e.g. be measured by the temperature sensor of the second bridge structure.

According to another embodiment, the second operation mode comprises a dynamic mode. In the dynamic mode the sensor is configured to perform a non-continuous heating of the first hotplate and/or the hotplate of the third bridge structure, in particular a pulsed or sinusoidal heating. The non-continuous heating may also be denoted as modulated heating. The sensor is configured to perform in the dynamic mode a measurement of one or more temperature parameters of the second bridge structure. In particular, a measurement of a phase shift between a temperature signal of the first hotplate and a temperature signal of the second bridge structure may be performed. Furthermore, a measurement of a phase shift between a temperature signal of the hotplate of the third bridge structure (if used as heating structure) and a temperature signal of the second bridge structure may be performed. Furthermore, a measurement of the amplitudes or pulse heights of temperature signals of the first bridge structure, the second bridge structure and/or the third bridge structure may be performed.

According to this embodiment, the sensor is operated such that the thermal heat flow between the heating hotplate (which may be the first hotplate and/or the hotplate of the third bridge structure) and the second bridge structure is not constant, but changing over time. Accordingly the heat flow between the heating hotplate and the second bridge structure does not reach a steady state. Such a dynamic mode allows to measure also time dependent temperature parameters such as the phase shift between the temperature signal of the first hotplate and the temperature signal of the second bridge structure or the second hotplate. The temperature signals may be in particular the temperature over time of the first hotplate, the temperature over time of the hotplate of the third bridge structure and the temperature over time of the second bridge structure. The temperature signals may be provided by the respective temperature sensors of the bridge structures. In addition and/or alternatively the amplitudes or pulse heights of the temperature signals of the first bridge structure/first hotplate, the hotplate of the third bridge structure and the second bridge structure/second hotplate may be used as temperature parameter.

According to a preferred embodiment the second operation mode comprises both the static mode and the dynamic mode. Such an embodied sensor has then at least three different operation modes, namely the first operation mode, the static mode as first sub-mode of the second operation mode and the dynamic mode as second sub-mode of the second operation mode.

According to embodiments, the first mode, the static mode of the second operation mode and the dynamic mode of the second operation mode may be performed sequentially and such a sequence may be repeated periodically.

According to a further embodiment the first mode and the static mode of the second operation mode or the first mode and the dynamic mode of the second operation mode may be performed in parallel.

According to the latter embodiments the first hotplate is heated and this heating of the first hotplate serves concurrently two different purposes. On the one hand, it brings the first patch to a desired operation temperature and on the other hand it heats the surrounding gas and provides a thermal heat transfer towards the second bridge structure. This thermal heat transfer allows measuring of thermal properties of the surrounding gas. Hence such an embodiment allows measuring the electrical properties of the first patch and the thermal properties of the gas simultaneously and with only one single heat source. Such an approach is very energy efficient.

According to another embodiment the sensor comprises a humidity sensor for measuring a relative humidity of the gas.

Such a humidity sensor can be used to compensate for the dependence of the thermal parameters of the gas on the relative humidity of the gas. According to one embodiment the humidity sensor may be integrated in the sensor as on-chip sensor. According to other embodiments an external humidity sensor may be used.

According to another embodiment the sensor is configured to use measurements results from the first operation mode to calibrate one or more sensor parameters, in particular drift parameters, of the second operation mode and/or to use measurements results from the second operation mode to calibrate one or more sensor parameters, in particular drift parameters, of the first operation mode.

This may improve the accuracy of the measurements of the first operation mode and the second operation mode. In particular, a MOX gas sensor often comprises a drift. Such a drift behaviour can be reduced or minimized by referencing the MOX gas sensor against the thermal property measurements performed in the second operation mode.

According to a further embodiment the sensor comprises a plurality of second bridge structures. Each of the plurality of second bridge structures comprises a temperature sensor and at least two of the plurality of second bridge structures are arranged at different distances to the heating bridge structures which may be the first bridge structure and/or the third bridge structure. The second operation mode is configured to operate the plurality of second bridge structures in a sensing mode and to perform a differential measurement of a thermal property of the gas. The second bridge structures may also be denoted as sensing bridge structures, Such an embodiment increases the possible options/parameters for analysing the gas even further. In particular, arranging the second bridge structures (sensing bridge structures) at different distances from the heating bridge structures (first bridge structure and/or third bridge structure) allows performing differential measurements in the second operation mode. With such differential measurements the influence of the thermal transition between the heating bridge structure (heating hotplate) and the surrounding gas as well as the influence of the thermal transitions between the surrounding gas and the second bridge structures (sensing bridge structures/sensing hotplates) may be eliminated. In other words, the difference between the temperature signals measured at the second bridge structures depends only on the thermal properties of the surrounding gas.

Such a differential measurement may be performed in the static as well as the in the dynamic sub-mode of the second operation mode.

According to a further embodiment the first, the second and/or the third bridge structures comprise at least a first and a second metal layer separated by at least one dielectric layer. The first metal layer forms the heater of the respective hotplate and the second metal layer forms at least in part the electrodes of the respective hotplate.

The dielectric layer is advantageously of at least one material selected from the group consisting of silicon oxide, silicon nitride, $Al_2O_3$ and $Ta_2O_5$.

The first metal layer is advantageously a platinum or tungsten layer. Both of these materials are well suited for withstanding high heater temperatures.

The second layer is advantageously a platinum or gold layer. This chemically inert metal is well suited for foaming stable electrodes.

In an advantageous geometry, the bridge structure comprises a central region forming said hotplate and two arms extending between said central region and said substrate. The width of the central region is larger than the minimum width of each of said arms, which further reduces the thermal conductance between the hotplate and the substrate while still providing a hotplate with a large area for receiving the sensing material. In addition, this further reduces the thermal mass of the bridge structure and allows to vary the temperature of the respective hotplates quickly.

Advantageously, the bridge structure consists of said central region and said two arms, i.e. the two arms form the sole connections between the central region and the substrate, thereby reducing the thermal conductance and thermal mass even further.

The central region has advantageously circular circumference, which gives it a shape well suited for receiving a liquid precursor of the sensing material during the manufacturing process. A definition of the term "circular circumference" is provided below.

Alternatively, the central region can have non-circular circumference, such as rectangular or polygonal circumference.

Alternatively, or in addition thereto, the central region can have an edge patterned with a plurality of recesses and/or projections (with the exception of the sections where the central region is connected to the arms of the bridge structure). Such an edge increases the total length of the circumference, thereby improving the lateral confinement (due to surface tension effects) of the liquid precursor of the sensing material during the manufacturing process ("pinning"). In addition or alternatively, the edge may improve the anchoring of the patch if the liquid precursor of the sensing material is drawn into the bays formed by the recesses in the edge, in particular if the recesses are narrow.

In yet another embodiment, the sensor comprises:

At least two electrode leads extending between said electrodes and said substrate. These electrode leads extend through a first one of said two arms.

At least two temperature sensor leads extending between said temperature sensor and said substrate. These temperature sensor leads extend through a second one of said arms.

This design separates the leads for the temperature sensor and the electrodes, providing a compact design and less crosstalk.

In a simple layout, the electrodes are coaxial, i.e. they are arranged around a common center. Advantageously, they comprise a center electrode and an outer electrode, which are typically electrically insulated from each other. The center electrode is circular, and the outer electrode extends along an azimuthal angle of at least 240°, in particular of at least 270°, around the center electrode.

Alternatively, the electrodes are interdigital electrodes.

In an advantageous embodiment, the temperature sensor and at least one of the electrodes, in particular both electrodes, are formed by the same one of said metal layers, namely the second metal layer.

In another embodiment, a first one of the electrodes is arranged at a layer below a second one of the electrodes. Hence, the electrodes are formed by different metal layers, which allows for a compact design of the device.

Advantageously, the first electrode is formed by the first metal layer and the second electrode is formed by the second metal layer, i.e. the first metal layer is used for the heater as well as for one of the electrodes.

Alternatively, the first electrode is formed by a third metal layer separate from the first and second metal layers, while the second electrode is formed by the second metal layer, thereby arranging the two electrodes and the heater in three different metal layers.

Advantageously, the first electrode is arranged at the bottom of a well extending all the way up through a topmost of the metal and dielectric layers of the hotplate. The patch of sensing material extends into this well, thereby establishing a good electrical contact also to the first electrode.

The temperature sensors of the first hotplate, the second hotplate and/or the third hotplate are advantageously separate from the respective heater, i.e. they are formed by a structure different from the heater. Since the heater is exposed to high electrical currents at elevated temperatures, it is subject to electromigration effects, for which reason its electrical properties tend to drift. By making the temperature sensor a separate device, its long-term stability is improved.

Alternatively, the temperature sensors can be formed by the heater itself, in which case the heater is advantageously formed by tungsten because tungsten has low susceptibility to electromigration.

According to an embodiment of another aspect of the invention a computer program product for operating a sensor according to embodiments of the first aspect is provided. The computer program product comprises a computer readable storage medium having program instructions embodied therewith. The program instructions are executable by the sensor to cause the sensor to perform in a first operation mode a measurement of an electrical property of the first patch and in a second operation mode a measurement of a thermal property of the gas by the second bridge structure. The thermal property is a thermal capacity and/or a thermal conductivity and/or a thermal diffusivity of the gas.

According to an embodiment of another aspect of the invention an electronic device, in particular a portable electronic device is provided that comprises a sensor according to embodiments of the first aspect. The portable electronic device may be e.g. a smartphone.

According to an embodiment of another aspect of the invention, a method for operating a sensor according to embodiments of the first aspect is provided. The method comprises steps of performing, in a first operation mode of the sensor, a measurement of an electrical property of the first patch and operating, in a second operation mode of the sensor, the second bridge structure in a sensing mode to perform a measurement of a thermal property of the gas. The thermal property is a thermal capacity, a thermal conductivity and/or a thermal diffusivity of the gas.

According to embodiments, the method comprises a step of operating, in the second operation mode, the first hotplate and/or a hotplate of a third bridge structure in a heating mode to heat the gas. Further steps comprise measuring, in the second operation mode, a temperature change or one or more temperature parameters as a result of the heating of the first hotplate and/or the hotplate of the third bridge structure and determining the thermal property of the gas from the temperature change and/or the temperature parameters.

According to embodiments, the method comprises steps of performing, in the second operation mode, a non-continuous heating of the first hotplate and/or the hotplate of the third bridge structure, in particular a pulsed or sinusoidal heating, and performing, in the second operation mode, a measurement of one or more temperature parameters of the second bridge structure.

According to an embodiment the method comprises performing a measurement of a phase shift between a temperature signal of the first hotplate and/or the hotplate of the third bridge structure and a temperature signal of the second bridge structure.

According to another embodiment, the method comprises performing a measurement of the amplitudes or pulse heights of temperature signals of the first bridge structure, the second bridge structure and/or the third bridge structure.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description refers to the annexed drawings, wherein.

All top views of the central part of the bridge structure show the patch of sensing material in transparent manner, with the structures below it in dashed or dotted lines. The drawings are not to scale.

MODES FOR CARRYING OUT THE INVENTION

Definitions

A "platinum layer" or a "tungsten layer" is understood to be a layer comprising at least 50%, in particular at least 90%, of said material (platinum or tungsten). The layer is typically not a continuous layer, but a structured layer e.g. forming one or more metal leads.

Similarly, a heater "of tungsten" designates a heater comprising at least 50%, in particular at least 90%, of tungsten.

The term "circular circumference" expresses that the circumferential edge of the central region (with the exception of the sections where the central region is connected to the arms of the bridge) lies within a circular ring with said ring having a radial width of no more than 20%, in particular no more than 10%, of its radius.

An "edge patterned with a plurality of recesses and/or projections" is an edge forming a series of recesses and projections (bays and fingers), such that the edge follows a tortuous path turning alternatingly inwards and outwards.

A "circular electrode" is an electrode whose circumferential edge lies within a circular ring with said ring having a radial width of no more than 20%, in particular no more than 10%, of its radius.

Figure 3:
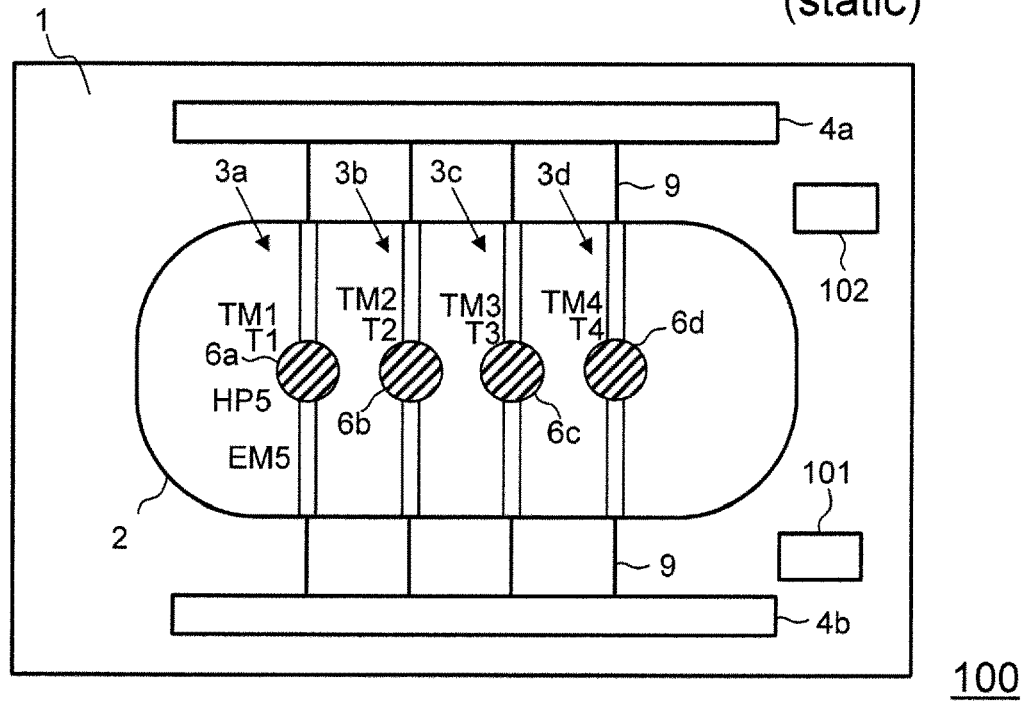
FIG. 3 is a top view of the sensor of FIG. 1 illustrating a static sub-mode of a second operation mode.

Terms such as "top", "bottom", "above", "below" are used in the sense that the side of the substrate that carries the bridges is the top side of the substrate. In this sense, the sensing patch of the embodiment of FIG. 3 is e.g. arranged at the top of the hotplate, above the electrodes.

The terms "radial" and "azimuthal" describe directions in respect to the center point of the hotplate, with "radial" designating a direction towards or away from the center point and "azimuthal" a direction tangential to a circle around the center point.

Figure 1:
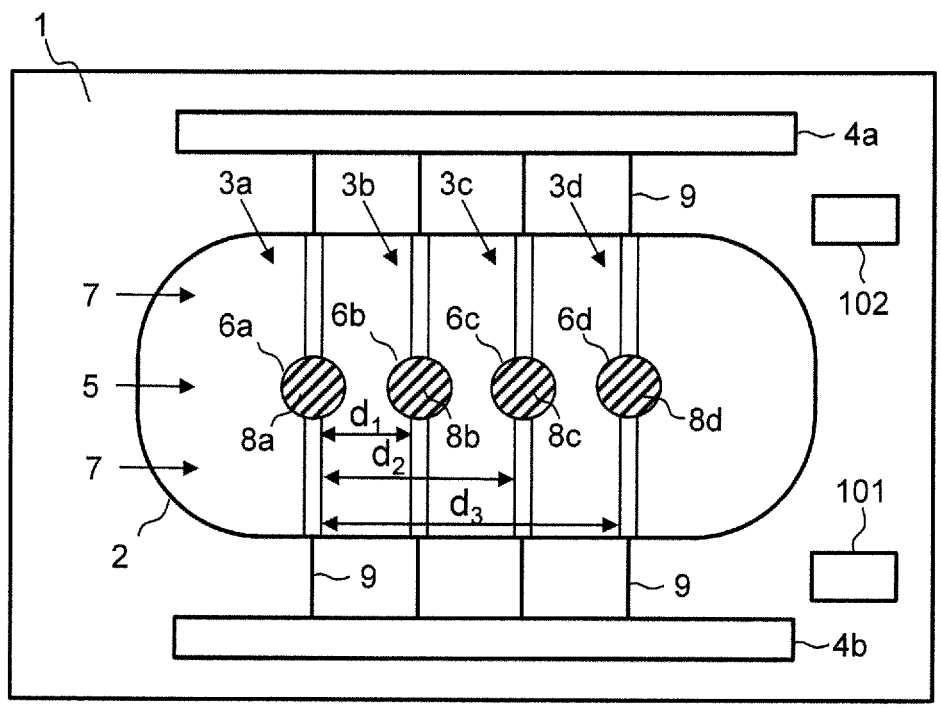
FIG. 1 is a top view of a sensor according to an embodiment of the invention having a first device geometry.

FIG. 1 shows a sensor 100 for detecting and/or analysing a gas.

In this context, it should be noted that the term gas shall include all kind of gas mixtures and that such gas mixtures may have a plurality of different components. The sensor 100 comprises a substrate 1, in particular a substrate of silicon. The substrate 1 has an opening or recess 2 arranged therein. The sensor 100 comprises a plurality of separate bridge structures that span this opening or recess 2. More particularly, the sensor 100 comprises a first bridge structure 3a that forms a first hotplate 6a, a second bridge structure 3b that forms a second hotplate 6b, a third bridge structure 3c that forms a third hotplate 6c and a fourth bridge structure 3d that forms a fourth hotplate 6d. In the following it may be referred to the plurality of bridge structures, e.g. the plurality of bridge structures 3a, 3b, 3c and 3d collectively as bridge structures 3 and to the plurality of hotplates, e.g. the hotplates 6a, 6b, 6c and 6d collectively as hotplates 6.

The sensor 100 comprises a first patch 8a of sensing material arranged on the first hotplate 6a, a second patch 8b of sensing material arranged on the second hotplate 6b, a third patch 8c of sensing material arranged on the third hotplate 6c and a fourth patch 8d of sensing material arranged on the fourth hotplate 6d. The sensing material may be in particular a metal oxide material. The sensing patches 8a, 8b, 8c and 8d may comprise the same sensing material or different sensing materials.

The sensing material is a material that changes at least one electrical property (in particular the real or imaginary part of its electrical impedance) as a function of the composition of the gas that surrounds it. The change of the property can be measured in order to obtain information on said composition.

The sensing material can e.g. contain at least one metal oxide material. Such metal oxide material generally may include one or more of tin oxide, zinc oxide, titanium oxide, tungsten oxide, indium oxide and gallium oxide. Such metal oxides may be used for the detection of analytes such as VOCs, carbon monoxide, nitrogen dioxide, methane, ammonia or hydrogen sulphide. Metal oxide sensors are based on the concept that gaseous analytes interact with the metal oxide layer at elevated temperatures of the sensitive layer in the range of more than 100° C., and specifically between 250° C. and 450° C. As a result of the catalytic reaction, the conductivity of the sensitive film may change, which change can be measured. Hence, such sensors are also denoted as high temperature chemoresistors for the reason that a chemical property of the analyte is converted into an electrical resistance at high temperatures of the sensitive film.

Each of the bridge structures $3a$, $3b$, $3c$ and $3d$ comprises a central region 5 forming the hotplates $6a$, $6b$, $6c$ and $6d$ respectively, and two arms 7 extending between the central regions 5 and the substrate 1, thereby suspending the hotplates $6a$, $6b$, $6c$ and $6d$ over recess or opening 2. The arms 7 extend collinear to each other and with the central region 5 with the hotplates being arranged between them.

Each of the bridge structures $3a$, $3b$, $3c$ and $3d$ comprises electrodes adapted to measure an electrical property of the first patch $8a$, the second patch $8b$, the third patch $8c$ and the fourth patch $8d$. Furthermore, each of the bridge structures $3a$, $3b$, $3c$ and $3d$ comprises a heater adapted to heat the first hotplate $6a$, the second hotplate $6b$, the third hotplate $6c$ and the fourth hotplate $6d$ respectively. In addition, each of the bridge structures $3a$, $3b$, $3c$ and $3d$ comprises a temperature sensor to measure the temperature of the respective bridge structure. The electrodes, heaters and temperature sensors are not shown in FIG. 1 for visual clarity reasons and will be described in detail below.

Further, substrate 1 carries integrated CMOS circuitry $4a$ and $4b$, e.g. including circuitry for driving the heaters and processing signals from the electrodes and temperature sensors as will be further described below. For this, the CMOS circuitry $4a$ and $4b$ is electrically connected to the heaters, electrodes and temperature sensors via interconnect circuitry 9. Advantageously, processing circuitry $4a$, $4b$ is integrated in CMOS technology since the whole device described herein is compatible with current CMOS manufacturing processes. Having the CMOS circuitry onboard of substrate 1 allows to reduce the number of bonds to the substrate and to increase signal-to-noise ratio. According to embodiments, the circuitry $4a$, $4b$ may be in particular control circuitry and/or processing circuitry adapted to operate and control the sensor 100 in a first operation mode and a second operation mode and to process signals from measurements taken in the first operation mode and the second operation mode, in particular temperature signals and/or temperature parameters from one or more temperature sensors.

Structures of the type shown in FIG. 1 can e.g. be built using techniques such as described in EP 2278308 or US 2014/0208830.

In particular, the process for manufacturing comprises the steps of forming a plurality of dielectric and metal layers on top of substrate 1. Some of these layers may be deposited in the course of the process for forming the CMOS circuitry $4a$, $4b$, e.g. as intermetal dielectric layer and metal layers, while other layers may be applied during post-processing, such as a tensile silicon nitride layer. Then, recess or opening 2 is formed using selective, anisotropic etching techniques. The patches $8a$, $8b$, $8c$ and $8d$ of sensing material can e.g. be applied using dispensing techniques where a drop or several drops of a liquid precursor of the sensing material is applied to the hotplates, such as e.g. described in EP 2952885.

The sensor 100 may comprise a humidity sensor 101 for measuring a relative humidity of the gas surrounding the sensor 100 as well as a pressure sensor 102 to determine the pressure of the gas surrounding the sensor.

The sensor 100 can be operated in at least two different operation modes, namely a first operation mode and a second operation mode.

Figure 2:
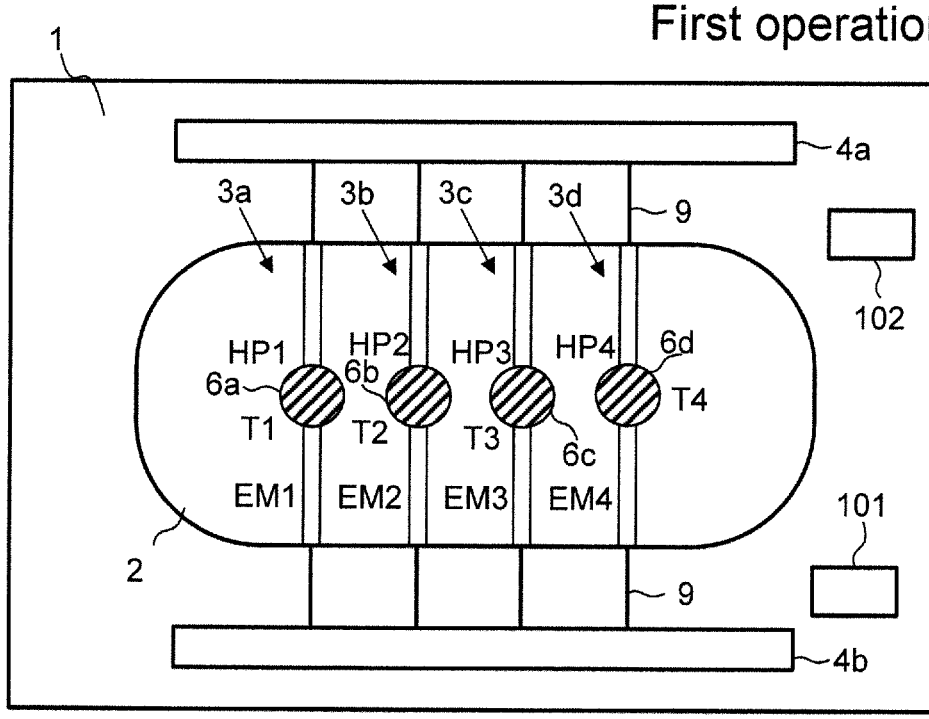
FIG. 2 is a top view of the sensor of FIG. 1 illustrating a first operation mode.

FIG. 2 illustrates the operation of the sensor 100 in the first operation mode. In the first operation mode, the sensor 100 performs a measurement of an electrical property of one or more of the patches $8a$, $8b$, $8c$ and $8d$. This may be in particular a measurement of the resistance of the respective patches. In order to bring the respective patches to a desired operation temperature, the sensor 100 performs a continuous or pulsed heating of the hotplates $6a$, $6b$, $6c$ and/or $6d$. According to the embodiment of FIG. 2, the hotplates $6a$, $6b$, $6c$ and $6d$ are operated with heating powers HP1, HP2, HP3 and HP4 respectively. The heating powers HP1, HP2, HP3 and HP4 may all be different and accordingly the hotplates $6a$, $6b$, $6c$ and $6d$ may be operated at different temperatures T1, T2, T3 and T4. Then the sensor 100 performs 4 different electrical measurements EM1, EM2, EM3 and EM4 of the electrical resistivity of the patches $8a$, $8b$, $8c$ and $8d$ respectively. Accordingly, four different parameters of the gaseous environment can be measured at once, thereby gaining a better understanding of its composition. Furthermore, as mentioned above, each of the hotplates $6a$, $6b$, $6c$ and $6d$ may be equipped with different sensing materials which may provide different measurement parameters and different information of the surrounding gas. According to embodiments all kind of combinations may be used. As an example, patches $8a$ and $8b$ may have the same sensing material, but may be operated at different temperatures, while patches $8c$ and $8d$ may have different sensing materials that are operated at the same temperature.

Figure 4:
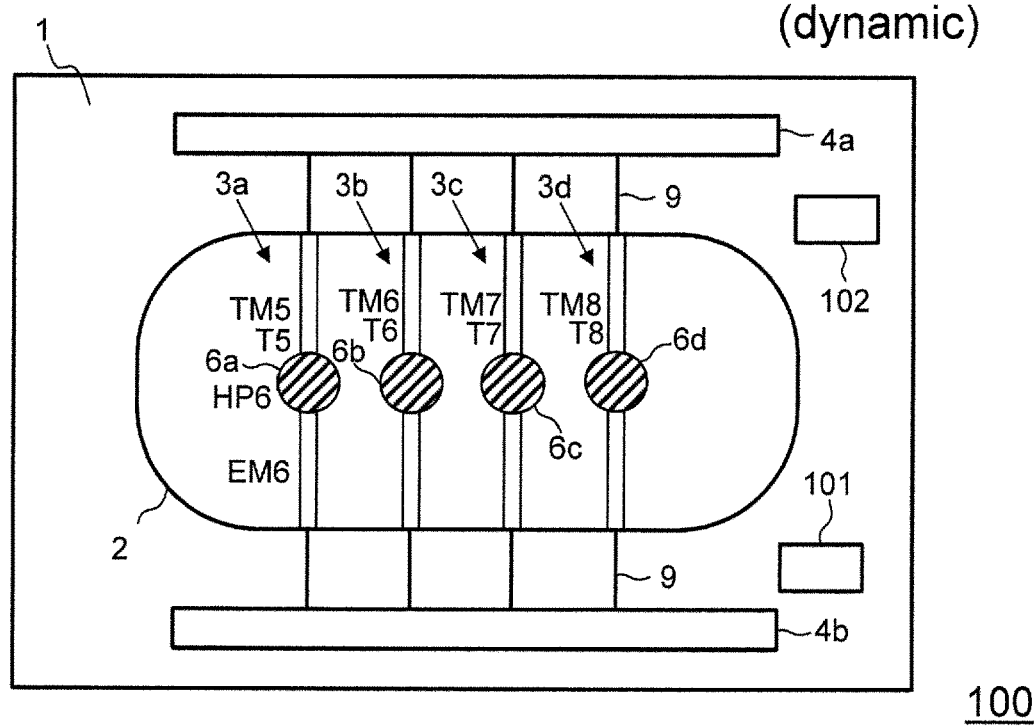
FIG. 4 is a top view of the sensor of FIG. 1 illustrating a dynamic sub-mode of the second operation mode.

FIG. 3 and FIG. 4 illustrates two different embodiments of the second operation mode which may also be considered as sub-modes of the second operation mode. In general, in the second operation mode the sensor 100 operates the first hotplate $6a$ in a heating mode and one or more of the other hotplates $6b$, $6c$ and $6d$ in a sensing mode.

FIG. 3 illustrates a static sub-mode of the second operation mode. In the static sub-mode, the first hotplate $6a$ is operated in a heating mode with a constant or static heating power HP5, and thereby constantly heats the gas surrounding the first hotplate $6a$. To control the heating power, the sensor 100 performs a temperature measurement TM1 of the first hotplate $6a$. The other hotplates, i.e. the second hotplate $6b$, the third hotplate $6c$ and the fourth hotplate $6d$ are simultaneously operated in the sensing mode and perform a measurement of a temperature change in response to the heating power HP5. More particularly, hotplate $6b$ performs a temperature measurement TM2, hotplate $6c$ a temperature measurement TM3 and hotplate $6d$ a temperature measurement TM4. In addition, the sensor 100 may perform simultaneously an electrical measurement EM5 of the electrical resistance of the first sensing patch $8a$ of the first hotplate $6a$.

The sensor 100 may then determine the thermal conductivity of the gas e.g. from the ratios of the temperature T1 of the first hotplate $6a$ to the temperatures T2, T3 and/or T4 of the hotplates $6b$, $6c$ and $6d$ respectively.

As illustrated in FIG. 1, the second bridge structure 3b is arranged at a distance $d_1$ from the first bridge structure 3a, the third bridge structure 3c is arranged at a distance $d_2$ from the first bridge structure 3a and the fourth bridge structure 3d is arranged at a distance $d_3$ from the first bridge structure 3a.

The different distances $d_1$, $d_2$ and $d_3$ can be used to perform differential measurements in order to eliminate the thermal transitions between the gas and the respective hotplate/bridge structure. As an example, the ratio of the temperature T1 to the temperature difference (T2-T3) could be taken. According to such an embodiment the second bridge structure 3b, the third bridge structure 3c and the fourth bridge structure 3d may also be commonly referred to as second bridge structures or sensing bridge structures.

FIG. 4 illustrates a dynamic sub-mode of the second operation mode. In the dynamic sub-mode, the first hotplate 6a is operated in a heating mode with a non-continuous heating power HP6 and performs a temperature measurement TM5 resulting in a temperature signal T5. The heating power HP6 may have in particular a pulsed or sinusoidal shape.

According to a preferred embodiment the frequency of the sinusoidal heating power HP6 may be in a range between 500 Hz and 5 kHz and according to an even more preferred embodiment between 1 kHz and 2 kHz. Such fast thermal modulations are facilitated by the low thermal mass of the hotplates/bridge structures according to embodiments of the invention.

The other hotplates, i.e. the second hotplate 6b, the third hotplate 6c and the fourth hotplate 6d are simultaneously operated in a sensing mode and perform temperature measurements of the temperature of the respective bridge structure/hotplate. More particularly, hotplate 6b performs a temperature measurement TM6 resulting in a temperature signal T6, hotplate 6c a temperature measurement TM7 resulting in a temperature signal T7 and hotplate 6d a temperature measurement TM8 providing a temperature signal T8. In addition, the sensor 100 may perform simultaneously an electrical measurement EM6 of the electrical resistance of the first sensing patch 8a. The sensor 100 may then e.g. determine the phase shifts between the temperature signal T5 of the first hotplate and the temperature signals T6, T7 and T8 of the bridge structures 3b, 3c and 3d respectively. In addition, or alternatively, the sensor 100 may determine the difference in the signal amplitudes between the temperature signal T5 of the first hotplate 6a and the signal amplitudes of the temperature signals T5, T6, T7 and T8 of the bridge structures 3b, 3c and 3d respectively.

The dynamic mode may provide information about the thermal conductivity and the thermal capacity of the surrounding gas.

According to one known model as disclosed by Kurt Kliche in the document "Integriertes Sensorsystem zur physikalischen Gasanalyse", HSG-IMIT, Institut für Mikro- and Informationstechnik der Hahn-Schickard-Gesellschaft e.V., Abschlussbericht-Kurzfassung, Jul. 12, 2011, Project Nr. 313601, AiF-Nr. 16046 N, the thermal conductivity a of a gas may be determined as follows:

$$a = \pi \cdot f \cdot (d2-d1)^2 / \Delta\varphi^2, \text{ wherein}$$

f is the frequency of the sinusoidal heating power of a heating source;
d2 and d1 are the distances of temperature sensors from the heating source; and
φ is the phase shift between measured temperature signals of the temperature sensors.

In view of the different distances between the first hotplate 6a (heating hotplate) and the sensing hotplates 6b, 6c and 6d, different volumes are to be heated by the first hotplate 6a. The measured temperature signals T6, T7 and T8 are dependent on the distance between the heating hotplate 6a and the respective sensing hotplate. Furthermore, they may depend on the thermal conductivity of the surrounding gas, on the thermal capacity of the surrounding gas, on the gas pressure and on the relative humidity of the gas.

The humidity sensor 101 may be used to measure the relative humidity of the gas and to eliminate the influence of the relative humidity on the thermal conductivity and the thermal capacity of the gas.

One known type of a semiconductor-based humidity sensor that could be used comprises a substrate on which a capacitor is formed by interdigitated metallic electrodes. A patch of a moisture-sensitive dielectric is disposed on the electrodes. The moisture-sensitive dielectric absorbs and releases water dependent to the relative environmental humidity, causing changes in the dielectric constant of the moisture-sensitive dielectric and thus changing the electrical capacitance of the capacitor. This change in capacitance is measured by electronic circuitry, which may be integrated on the same substrate. An example of a capacitive semiconductor-based humidity sensor of this type is disclosed, e.g., in U.S. Pat. No. 6,690,569.

The pressure sensor 102 may be used to measure the gas pressure of the gas and to eliminate the influence of the gas pressure on the thermal conductivity and the thermal capacity of the gas.

The pressure sensor may be embodied as capacitive semiconductor-based pressure sensors. Such sensors can comprise a deformable membrane that covers a cavity. A first electrode is disposed in the cavity or is formed by a wall portion of the cavity. The membrane forms or carries a second electrode. Pressure changes cause deformations of the membrane. Such deformations change the electrical capacitance between the two electrodes. These changes are detected by circuitry integrated with the sensor. Various examples of pressure sensors of this type are disclosed, e.g., in U.S. Pat. No. 7,704,774 B2.

According to another embodiment the sensor 100 may also be embodied as pressure sensor. According to such an embodiment the gas that surrounds the sensor should be known. This could be either established by operating the sensor 100 in a known gaseous environment or by determining the respective gas in the first operation mode. If the gas surrounding the sensor 100 is known, a thermal conductivity measurement of the second operation mode may be used to determine the gas pressure as the thermal conductivity depends on the pressure of the respective gas.

According to some embodiments, the sensor 100 may combine the measurements results from the first operation mode and the second operation mode to determine the gas composition and/or the gas concentration of the surrounding gas. Preferably the sensor combines the measurements results from three operation modes, namely the first operation mode, the static sub-mode of the second operation mode and the dynamic sub-mode of the second operation mode.

This combined information can be used to improve the gas analysis e.g. in ten is of accuracy, reliability and sensitivity.

It should be noted that according to other embodiments of the second operation mode the respective hotplate that operates in the heating mode and the hotplates that operate in the sensing mode may be changed. As an example, according to other embodiments of the second operation mode, the hotplate 6b may operate in the heating mode, while the other hotplates 6a, 6c and 6d may operate in the sensing mode.

In the following various embodiments of the bridge structures 3a, 3b, 3c and 3d are described in more detail which facilitate an efficient and accurate operation of the sensor 100. In particular, the bridge structures according to embodiments of the invention are designed such that they provide a low thermal capacity and low thermal mass which facilitates a fast thermal modulation of the hotplates 6a, 6b, 6c and 6d. The embodiments described below illustrate various advantageous aspects, which can be cross-combined or used individually. In particular, even if a feature is mentioned for only one of the embodiments below, it can be advantageously also used in the other embodiments or separately.

In the following a more detailed view of embodiments of the bridge structures 3a, 3b, 3c and 3d is provided. Each of the bridge structures 3a, 3b, 3c and 3d may be embodied as described below. To ease the referencing, it may be commonly referred to the bridge structures 3a, 3b, 3c and 3d as bridge structure 3. In a corresponding manner, it may be commonly referred to the hotplates 6a, 6b, 6c and 6d as hotplate 6, and to the patches 8a, 8b, 8c and 8d as patch 8.

A first embodiment of a bridge structure 3 is illustrated in FIGS. 5-8. These figures show central region 5 as well as the central ends of the arms 7 of the bridge structure 3.

Figure 5:
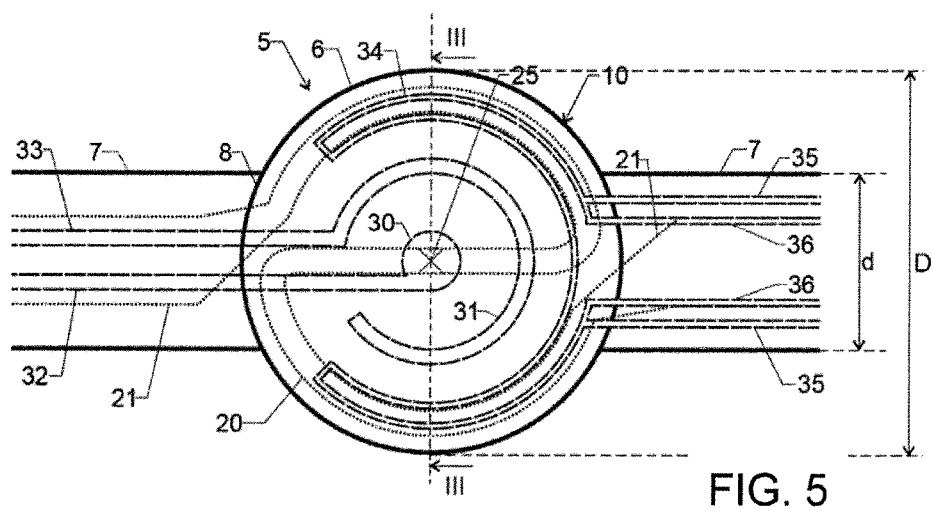
FIG. 5 is a top view of the central part of a bridge structure of the sensor.
Figure 6:
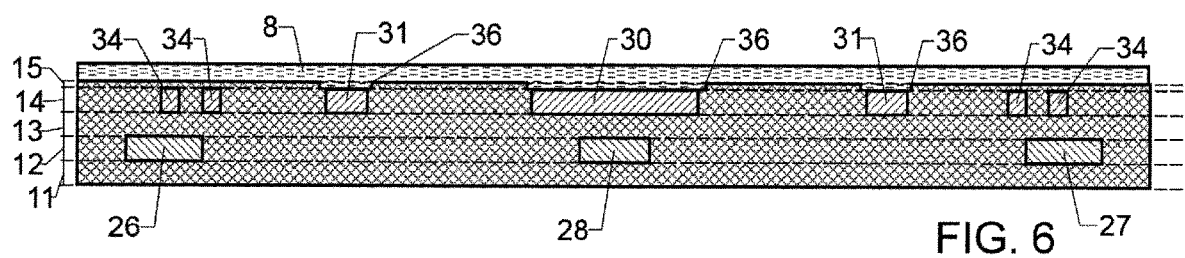
FIG. 6 is a sectional view along line of FIG. 5.
Figure 7:
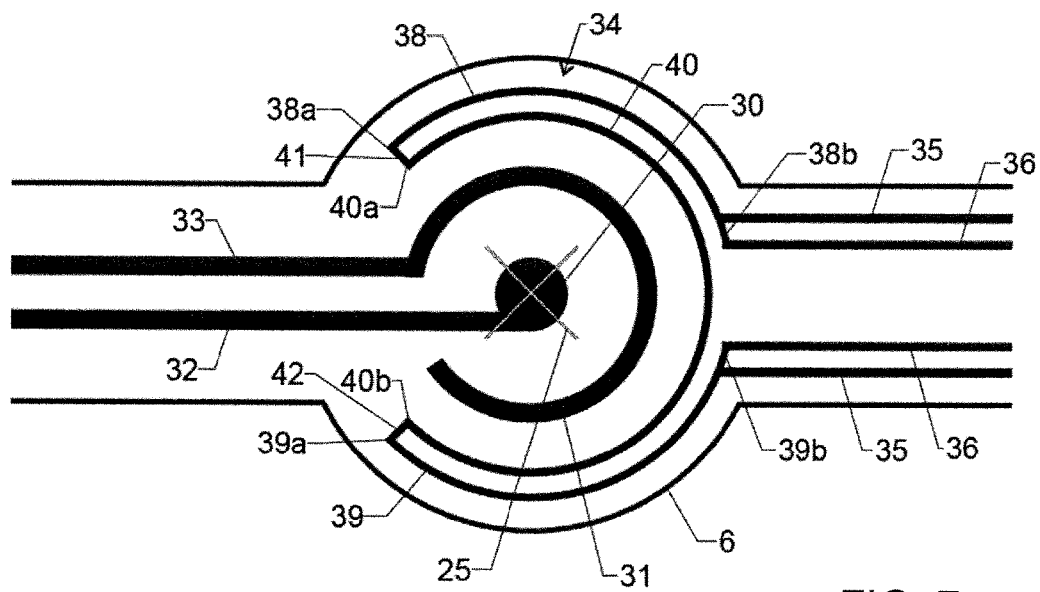
FIG. 7 shows the structures in a second metal layer of the embodiment of FIG. 5.

As can best be seen from FIGS. 5 and 6, central region 5 has a circular circumference 10 as defined above. Its diameter/width D is larger than the minimum width d of each arm 7. For example, the width D of central region 5 can be between 20 and 50 μm, while the minimum width d of each arm can be between 10 and 20 μm.

Bridge structure 3 is formed by a plurality of dielectric layers and metal layers. The metal layers will be described in more detail below. The dielectric layers can, in particular, comprise layers of silicon oxide and/or silicon nitride.

In one embodiment, as shown in FIG. 6, bridge structure 3 can comprise at least one bottommost dielectric layer 11, a first metal layer 12, a second dielectric layer 13, a second metal layer 14, and a top dielectric layer 15. (The reference numbers indicating the approximate levels of the various layers are shown at the left of FIG. 6.)

As discussed in more detail below, bottommost dielectric layer 11 can also be omitted, or only be present over part of first metal layer 12, thereby exposing at least part of first metal layer 12 at the bottom of hotplate 6.

In the shown embodiment, patch 8 of sensing material covers substantially all of central region 5, i.e. all of hotplate 6.

In one advantageous embodiment, patch 8 is only applied to one side of hotplate 6, namely to its top side, but not to its bottom side. Alternatively, and as mentioned below, patch 8 can also extend over at least part of the bottom side of hotplate 6.

The thickness of patch 8 is comparatively thin. Advantageously it is less than 20 μM, in particular less than 10 μm, and it is typically at least 1 μm.

First Metal Layer:

First metal layer 12 is, in the shown embodiments, the bottommost metal layer in bridge structure 3. It is advantageously a tungsten or platinum or gold layer. The structures formed by first metal layer 12 are shown in dotted lines in FIG. 5 and as black regions in FIG. 8.

First metal layer 12 forms a heater 20 and heater leads 21.

The purpose of heater 20 is twofold. In the first operation mode its purpose is to heat the hotplates 6a, 6b, 6c and/or 6d to a temperature suitable for measuring one or more analyte (s). Typical temperatures are given above. It may also be used for thermally resetting the sensor by heating the sensing material to a temperature above its normal operating temperature, thereby releasing any adsorbed or bonded contaminants.

In the second operation mode the purpose of the heater 20 of the first hotplate 6a is to heat the gas surrounding the sensor, while the heaters 20 of the other hotplates 6b, 6c and 6d that are operated in the sensing mode are switched off.

The purpose of the heater leads 21 is to feed current to heater 20. They extend through separate arms 7.

The width of the heater leads 21 is larger than the width of the leads forming heater 20 in order to concentrate the heat generation to the hotplate 6. For example, the heater leads 21 may have a width of 5-10 μm, while the lead of heater 20 itself has a width between 1-5 μm.

Heater 20 is formed by a single lead extending between the inner ends of the heater leads 21.

Advantageously, heater 20 has two-fold symmetry under rotation about a center point 25 of hotplate 6 (which is denoted by a 45° cross in the drawings). It consists of a first section 26 extending along a circle around center point 25, a second section 27 extending along the same circle, and a radial section 28, the latter connecting a first end 26a of first section 26 with a first end 27a of second section 27. The second end 26b of first section 26 is connected to a first one of the heater leads 21, while the second end 27b of second section 27 is connected to the second one of the heater leads 21.

Advantageously, each of said first and second sections 26, 27 extends over an azimuthal angle of at least 120° around center point 25.

Second Metal Layer:

Second metal layer 14 is, in the shown embodiments, the topmost metal layer in bridge structure 3. It is advantageously a platinum or gold layer. The structures formed by second metal layer 14 are shown in dashed lines in FIG. 5 and as black regions in FIG. 7.

In most of the embodiments shown, second metal layer 14 foams a pair of electrodes 30, 31, electrode leads 32, 33, a temperature sensor 34 and temperature sensor leads 35, 36.

The purpose of the electrodes 30, 31 is to electrically contact patch 8 of sensing material in order to measure its resistance. They are exposed to patch 8 by a suitably placed windows 36 in topmost dielectric layer 15.

The electrodes 30, 31 are coaxial to central point 25 of hotplate 6. In the embodiment shown, one electrode is a circular center electrode 30. The other electrode forms an outer electrode 31 and extends along an angle of at least 240°, in particular along an azimuthal angle of at least 270°, around center electrode 30. Advantageously, outer electrode 31 extends along a circle coaxial to center point 25.

The electrode leads 32, 33 connect the electrodes 30, 31 to the processing circuitry 4a, 4b of FIG. 1 and extend through a first one of the arms 7.

The purpose of temperature sensor 34 is to measure the temperatures on the respective hotplates 6a, 6b, 6c and 6d. The temperature or temperature signal derived from the respective temperature sensor 34 of the hotplates 6a, 6b, 6c and 6d is also used for different purposes dependent on the operation mode of the sensor 100.

In the first operation mode, the temperature sensors 34 are in particular used for controlling the temperature of the hotplates 6a, 6b, 6c and 6d. In addition, the signal of the temperature sensors 34 can be used to take temperature dependencies into account.

In the second operation mode, the temperature sensors 34 are in particular used to measure the thermal properties of the gas that shall be analysed. More particularly, in the static sub-mode of the second operation mode the temperature sensors 34 of the respective hotplates measure the corresponding temperature of the respective hotplate/bridge structure. From the temperature difference between the first hotplate 6a that is operated in the heating mode and the other three hotplates 6b, 6c and 6d that are operated in the sensing mode, the thermal conductivity of the gas may be derived. In the dynamic sub-mode of the second operation mode the temperature sensors 34 of the respective hotplates measure e.g. as temperature signals the temperature over time of the hotplates 6a, 6b, 6c and 6d. The sensor 100 derives then from these temperature signals e.g. the phase shifts between the temperature signal of the first (heating) hotplate 6a and the sensing hotplates 6b, 6c and 6d. These phase shifts can then be used to derive the thermal conductivity and thermal capacity of the surrounding gas.

According to an advantageous embodiment, temperature sensor 34 comprises a first section 38 and a second section 39 extending along a common outer circle, with each of said first and second sections advantageously extending over an azimuthal angle at least 90°. It further comprises a third section 40 extending along an inner circle, coaxial and at a distance to the outer circle. Advantageously, third section 40 extends over an azimuthal angle of at least 180°. Both, the inner and the outer circles, are advantageously coaxial to center point 25 of hotplate 6. One end 38a of first section 38 and one end 39a of second section 39 are connected to opposite ends 40a, 40b of third section 40 by means of connecting leads 41, 42, which connecting leads 40, 41 are advantageously formed by straight or curved sections much shorter than, advantageously at least ten times shorter than, any of the first, second and third sections 38-40. The second ends 38b, 39b of the first and second sections 38, 39 are connected to the temperature sensor leads 35, 36.

The temperature sensor leads 35, 36 connect temperature sensor 34 to processing circuitry, e.g. the circuitry 4a, 4b of FIG. 1. They advantageously extend through a second one of the arms 7, i.e. not through the same arm as the electrode leads 32, 33.

In the embodiment shown, two separate temperature sensor leads 35, 36 are advantageously connected to second end 38b of first section 38, and two separate temperature sensor leads 35, 36 are connected to second end 39b of second section 39, which allows to carry out a four point measurement with one pair 36 of the temperature sensor leads carrying a current and the other pair 35 being used for measuring the voltage drop over temperature sensor 34, thereby eliminating any voltage drop over the current carrying leads.

Figure 9:
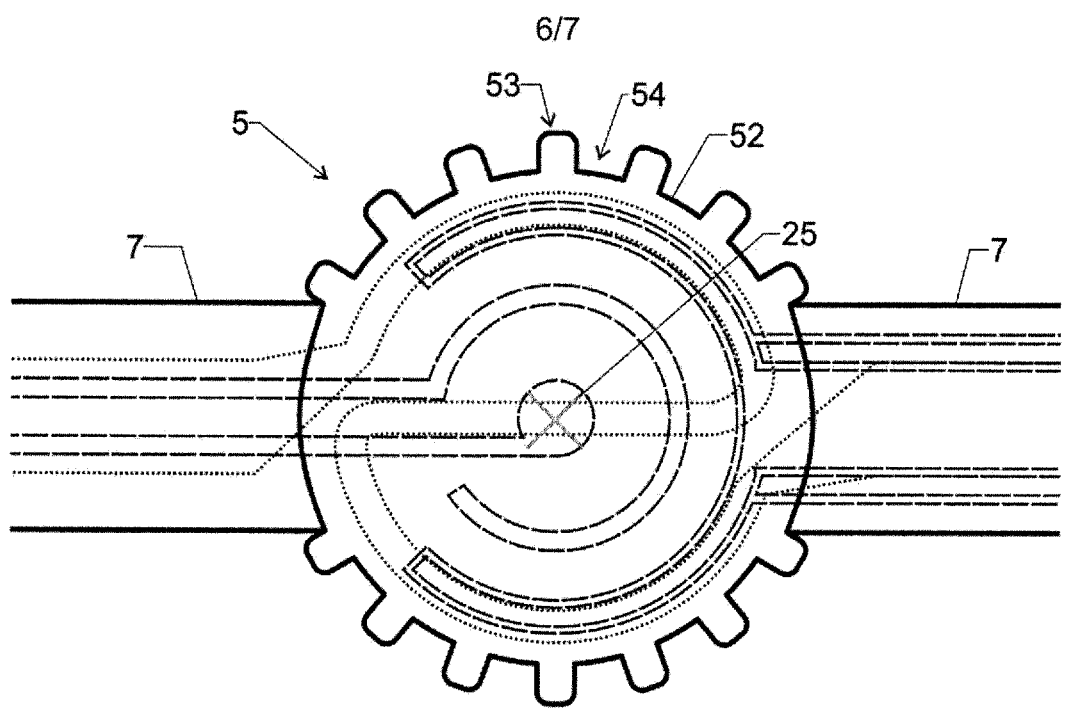
FIG. 9 is a top view of the central part of a bridge structure of yet another embodiment of the sensor.

Another embodiment as illustrated in FIG. 9 teaches a feature that can be combined with any of the previous embodiments, in fact with any embodiments where the bridge structure comprises a central region held by two or more arms.

The shown embodiment of FIG. 9 differs from the previous embodiments in that the edge 52 of central region forms a plurality of recesses and/or projections, in the sense as defined above.

Advantageously, the projections and recesses of edge 52 are formed by all dielectric layers of bridge 3 (i.e. all dielectric layers extend all the way to edge 52) for maximum mechanical strength.

The projections and recesses advantageously form a series of fingers 53 separated by bays 54, in particular at least four, advantageously at least six, such fingers.

In one advantageous embodiment, the azimuthal width of the bays is between 1 to 3 μm, and their radial length between 2 and 4 μm, in particular 3 μm.

Edge 52 with its recesses and/or projections increases the total length of the edge or circumference of hotplate 6. As mentioned above, this design allows to better confine the liquid precursor of the sensing material to the central region and prevent it from flowing over the edge (pinning).

On the other hand, if a sufficient amount of the liquid precursor is added, it will start to flow into the bays 54, a flow encouraged by capillary forces, thereby anchoring patch 8 and counteracting delamination effects.

In the embodiment of FIG. 1, each hotplate 6 and the corresponding central region 5 are arranged in the center of their bridge structure 3, i.e. the arms 7 connected to each central region 5 are of equal length.

Alternatively, the arms 7 connected to central region 5 of at least one of the bridge structures 3 may be of unequal length, and, in particular, the lengths of the arms of a bridge structure 3 may differ by at least 10%, in particular by at least 30%. In that case, central region 5, as well as hotplate 6, are not arranged in the center of their bridge structure 3.

Figure 10:
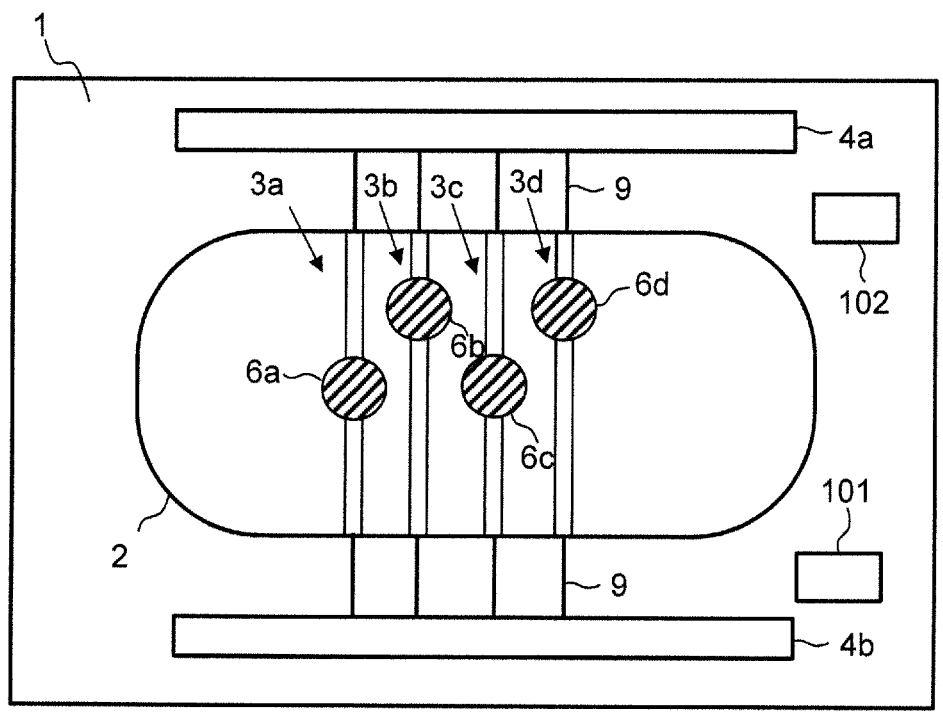
FIG. 10 is a top view of a sensor with a second device geometry.

Such a design is illustrated in FIG. 10. While the first hotplate 6a and the third hotplate 6c are still arranged in the center of the bridge structures 3a and 3c respectively, the second hotplate 6b and the fourth hotplate 6d are arranged in an asymmetric way. Such a design is particularly useful for increasing the density of the device. Furthermore, it increases the variability to adapt/design the distances between the hotplates and the thermal flow between the heating hotplate and the sensing hotplates in the second operation mode.

Figure 11:
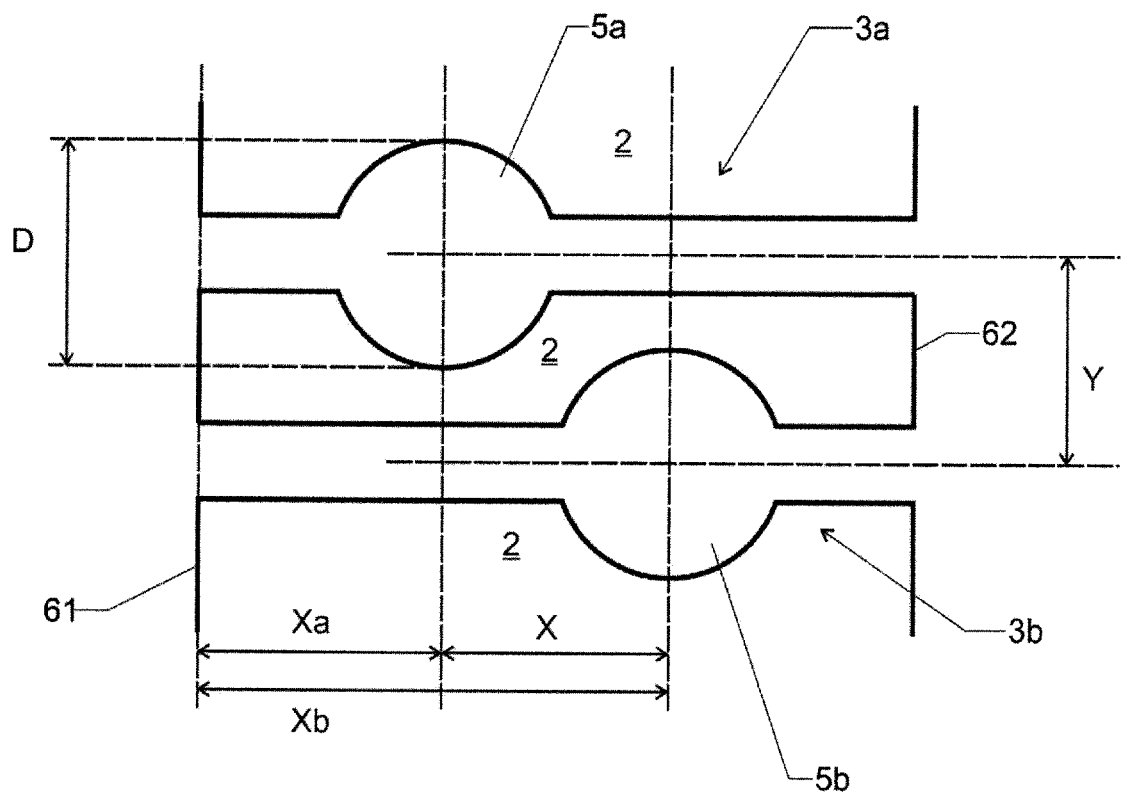
FIG. 11 shows a detail from FIG. 10.

In particular, and as illustrated in more detail in FIG. 11, a large density can be achieved if the device comprises at least two parallel, neighbouring bridge structures 3a, 3b where the central regions 5a, 5b of the neighbouring bridge structures 3a, 3b are, in a direction along the bridge structures 3a, 3b (i.e. in the longitudinal direction of the bridges) offset in respect to each other. In other words, if the neighbouring bridge structures 3a, 3b extend from a first side 61 to a second side 62 of opening or recess 2, the distance Xa, Xb of the middle point of their central regions 5a, 5b from first side 61 are different.

In particular, the central regions are offset in respect to each other by a distance X of at least half of their diameter/width D, i.e. by at least D/2, in particular by at least D. In other words, the difference X of the distances Xa, Xb of the center points of the central regions 5a, 5b from first side 61 is at least D/2, in particular at least D.

As illustrated in FIG. 11, this design even allows to arrange the central regions 5 such that, in a direction perpendicular to a longitudinal direction of the neighbouring bridge structures 3a, 3b, the distance Y of the centers of the central regions 5a, 5b of the at least two neighbouring bridge structures 3a, 3b is smaller than the width D of the central regions.

It should be noted that for ease of illustration the bridge structures 3a and 3b of FIG. 11 have been rotated by 90° with respect to the illustration of FIG. 10.

Figure 13:
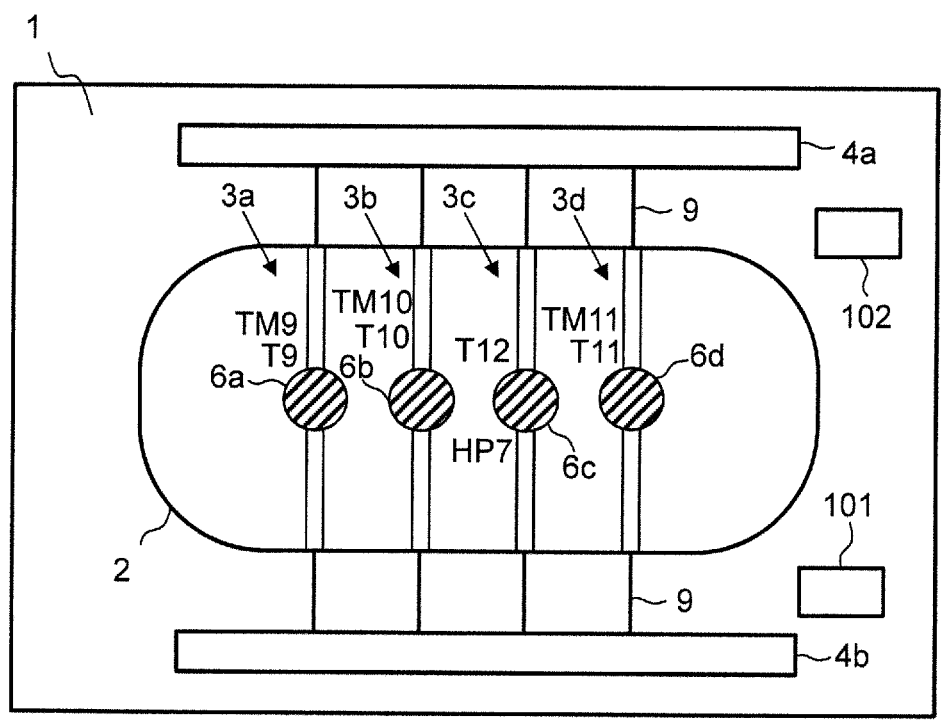
FIG. 13 is a top view of the sensor of FIG. 1 illustrating another embodiment of the second operation mode.

FIG. 13 illustrates another embodiment of the second operation mode. In this embodiment the sensor 100 operates the third hotplate 6c in a heating mode and one or more of the other hotplates 6a, 6b and 6d in a sensing mode.

The second operation mode in this embodiment may be the static sub-mode or the dynamic sub-mode. Accordingly, the third hotplate 6c may be operated with a constant or static heating power HP7. The other hotplates, i.e. the second hotplate 6b, the first hotplate 6a and the fourth hotplate 6d are simultaneously operated in the sensing mode and may also be commonly referred to as second hotplates/sensing hotplates. The sensing hotplates perform a measurement of a temperature change in response to the heating power HP7. More particularly, hotplate 6a performs a temperature measurement TM9, hotplate 6b a temperature measurement TM10 and hotplate 6d a temperature measurement TM11.

The sensor 100 may then determine the thermal conductivity of the gas e.g. from the ratios of the temperature T12 of the hotplate 6c to the temperatures T9, T10 and/or T11 of the hotplates 6a, 6b and 6d respectively.

Figure 8:
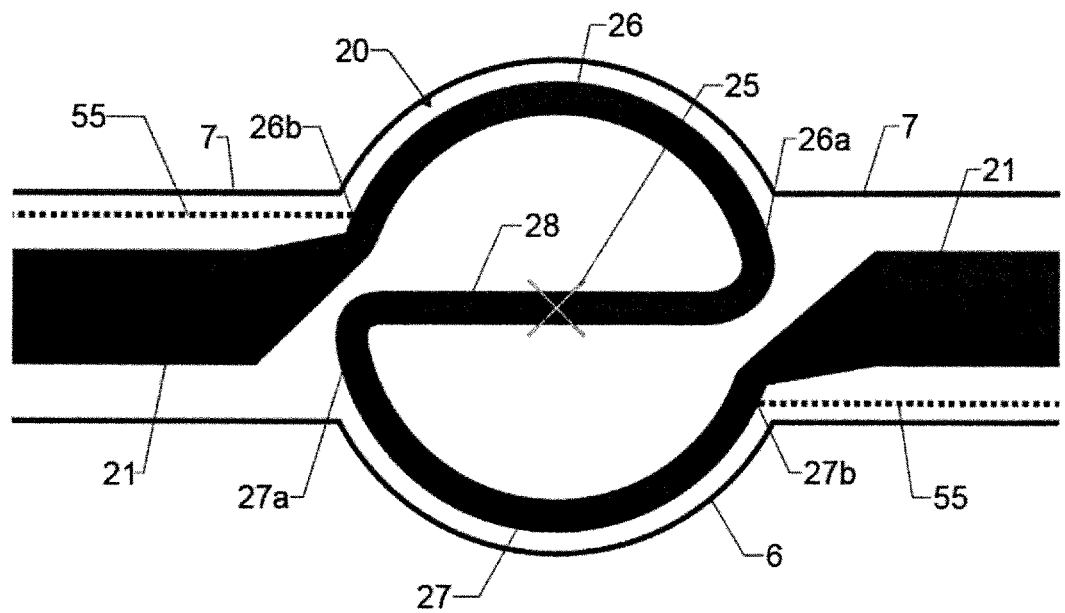
FIG. 8 shows the structures in a first metal layer of the embodiment of FIG. 5.

Notes:

In the embodiments above, temperature sensor 34 is separate from heater 20. As mentioned, the temperature sensor can alternatively be formed by the heater itself. According to such an embodiment, the first metal layer 12 may be e.g. a tungsten layer or a platinum layer. In that case, advantageously, auxiliary sensing leads are embedded in first metal layer 12 in order to carry out a four point measurement. Such sensing leads are indicated in FIG. 8 by dotted lines 55.

Advantageously, bridge structure 3 contains no silicon layers in order to reduce thermal conductivity and thermal mass. In particular, bridge structure 3 consists only of dielectric layers, such as the layers 11, 13, 15, two or three metal layers, such as the layers 12, 14, 59, as well as the patch 8 of sensing material.

As shown above, patch 8 can be applied to only one or two both sides of hotplate 6. In the latter case, patch 8 advantageously extends over the lateral edge of or through an opening in hotplate 6, in which case one electrode can be mounted to the bottom side of hotplate 6.

Figure 12:
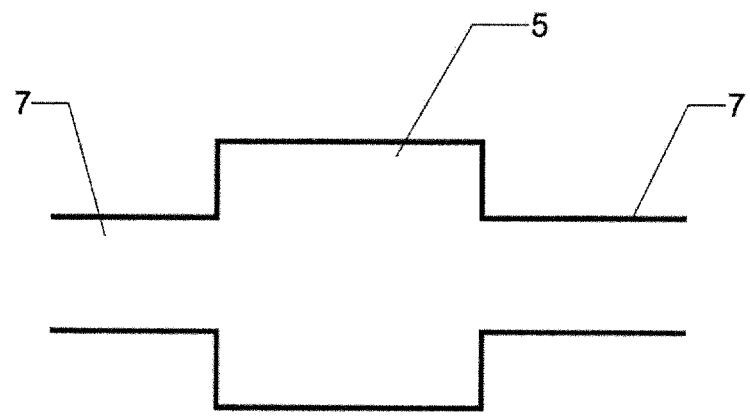
FIG. 12 shows part of a bridge structure with a non-circular central region.

In the above examples, central region 5 has circular circumference. However, central region 5 may also have non-circular circumference, such as rectangular or polygonal circumference. An example of a bridge structure with rectangular circumference is shown in FIG. 12.

As can be seen in the above embodiments, the longitudinal axis of the bridge structures 3 advantageously extends perpendicularly to the edges of recess or opening 2 that they are connected to since this reduces the footprint of the device.

The arms 7 are advantageously rectangular, i.e. they have constant width along their length.

In the first operation mode, the hotplates of the different bridge structures of the device can be maintained at differing temperatures, e.g. between 200 and 500° C. The temperature differences between neighbouring bridge structures may be substantial. Hence, it is particularly advantageous to implement the control electronics for maintaining the temperature in the hotplates in the CMOS circuitry 4a, 4b in order to achieve precise control of the temperatures.

Figure 14:
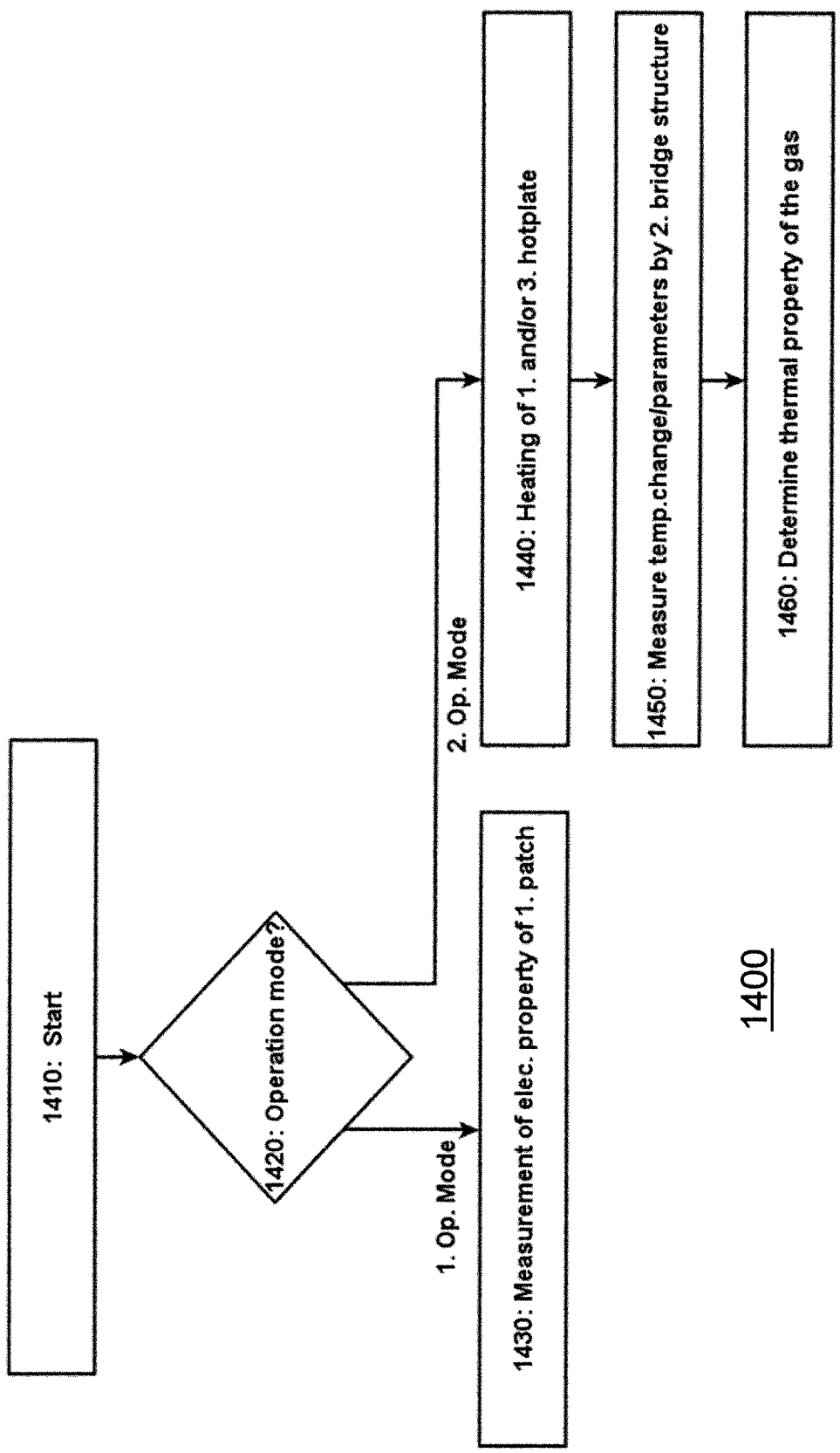
FIG. 14 is a flow chart of method steps of a method for operating a sensor.

FIG. 14 is a flow chart of method steps of a method 1400 for operating a sensor, e.g. a sensor as described above with reference to FIGS. 1-13.

At a step 1410, the method is started.

At a step 1420, it is decided whether the sensor shall be operated in the first or in the second operation mode or in both the first and the second operation mode. According to embodiments, the first and the second operation mode may be operated in parallel or in an alternating way.

If the sensor shall be operated in the first operation mode, the first operation mode is switched on. Then, the sensor performs at a step 1430 a measurement of an electrical property of the first patch, e.g. of the first patch 8a of FIG. 1.

If the sensor shall be operated in the second operation mode, the second operation mode is switched on. Then at a step 1440 the sensor operates the first hotplate 6a and/or a hotplate of a third bridge structure in a heating mode and accordingly heats the surrounding gas. Furthermore, at a step 1450, the sensor operates the second bridge structure in a sensing mode to perform a measurement of a thermal property of the gas in dependence on the heating of the first hotplate 6a and/or a hotplate of a third bridge structure. Steps 1440 and 1450 are performed simultaneously according to embodiments. The thermal property is a thermal capacity, a thermal conductivity and/or a thermal diffusivity of the gas. More particularly, the sensor measures at the step 1450 a temperature change or one or more temperature parameters as a result of the heating of the first hotplate and/or the hotplate of the third bridge structure. Then, at a step 1460, the sensor determines the thermal property of the gas from the temperature change and/or the temperature parameters.

According to embodiments, the heating of the first hotplate 6a and/or the hotplate 6c of the third bridge structure 3c, performed at step 1440, may be a non-continuous heating in particular a pulsed or sinusoidal heating.

Furthermore, according to such an embodiment the sensor may perform at step 1450 a measurement of a phase shift between a temperature signal of the first hotplate and/or the hotplate 6c of the third bridge structure 3c and a temperature signal of the second bridge structure 3b. The phase shift establishes a temperature parameter according to an embodiment of the invention.

According to another embodiment, the sensor may perform at step 1450 a measurement of the amplitudes or pulse heights of temperature signals of the first bridge structure, the second bridge structure and/or the third bridge structure. The temperature signals may be in particular the temperatures measured by the temperature sensors of the respective bridge structures. The amplitudes or pulse heights establish temperature parameters of the temperature signals according to an embodiment of the invention.

According to embodiments, the operation of the sensor and the execution of the method steps may be controlled by electronic circuitry of the sensor, e.g. by the circuitry 4a, 4b as described with reference to FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A sensor for detecting and/or analysing a gas, the sensor comprising a substrate (1);
   a recess or opening (2) arranged in the substrate (1);
   a first bridge structure (3a) and a second bridge structure (3b), extending over said recess or opening (2) and being anchored in the substrate (1);

wherein
the first bridge structure (3 a) forms a first hotplate (6a) and comprises
a first patch (8a) of sensing material, in particular of a fetal oxide material, arranged on the first hotplate (6a);
electrodes (30, 31) adapted to measure an electrical property of the first patch;
a heater (20) adapted to heat the first hotplate (6a);
the second bridge structure (3b) comprises at least a temperature sensor (34);
the sensor comprises circuitry (4a, 4b) for driving the heater and for processing signals from the electrodes (30, 31) and the temperature sensor (34); and
the sensor provides
a first operation mode configured to perform a measurement of an electrical property of the first patch (8 a); and
a second operation mode configured to operate the second bridge structure (3b) in a sensing mode to perform, a measurement of a thermal property of the gas, wherein the thermal property is a thermal capacity and/or a thermal conductivity and/or a thermal diffusivity of the gas.

2. The sensor of claim 1, wherein the second operation mode is configured to operate the first hotplate (6a) in a heating mode to heat the gas.

3. The sensor of claim 1, wherein the second operation mode is configured to
operate the first hotplate (6a) and/or a hotplate of a third bridge structure (3c) in a heating mode to heat the gas; and
operate the second bridge structure (3b) in the sensing mode to measure a temperature change or one or more temperature parameters as a result of the heating of the first hotplate and/or the hotplate of the third bridge structure and to determine the thermal property of the gas from the temperature change and/or the temperature parameters.

4. The sensor of claim 1, wherein the second bridge structure (3b) forms a second hotplate (6b) and comprises
a second patch (8b) of sensing material, in particular of a metal o oxide material, arranged on the second hotplate (6b);
electrodes (30, 31) adapted to measure an electrical property of the second patch (8b);
a heater (20) adapted to heat the second hotplate (6b);
wherein the first operation mode is configured to perform a measurement of an electrical property of the first patch (8a) and the second patch (8b).

5. The sensor of claim 1, wherein the sensor comprises a third bridge structure comprising a hotplate and a heater and wherein the second operation mode is configured to operate the hotplate (6c) of the third bridge o structure in a heating mode to heat the gas.

6. The sensor of claim 1, wherein the sensor is operable to perform in the second operation mode a measurement of a thermal capacity and/or a thermal conductivity and/or a thermal diffusivity of the gas.

7. The sensor of claim 1, wherein the sensor is configured to combine measurement results from the first operation mode and the second operation mode to determine the gas composition and/or the gas concentration of the gas.

8. The sensor of claim 1, wherein the sensor is operable to use measurement results of the second operation mode for determining a pressure of the gas.

9. The sensor of claim 1, wherein the sensor is configured to perform in the first operation mode a continuous or pulsed heating of the first hotplate (6a) and/or the second hotplate (6b) and/or the hotplate (6c) of the third bridge structure (3c).

10. The sensor of claim 1, wherein the sensor is configured to perform in the second operation mode
a continuous heating of the first hotplate (6a) and/or the hotplate (6c) of the third bridge structure (3c); and
a measurement of a temperature change of the second bridge structure (6b) in response to the heating of the first hotplate (6a) and/or the heating of the hotplate (6c) of the third bridge structure (3 c).

11. The sensor of claim 1, wherein the sensor is configured to perform in the second operation mode
a non-continuous heating of the first hotplate (6a) and/or the hotplate (6c) of the third bridge structure (3c), in particular a pulsed or sinusoidal heating; and
a measurement of one or more temperature parameters of the second bridge structure (3b).

12. The sensor of claim 11, wherein the sensor is configured to perform in the second operation mode
a measurement of a phase shift between a temperature signal of the first hotplate (6a) and/or the hotplate (6c) of the third bridge structure (3c) and a temperature signal of the second bridge structure (3h).

13. The sensor of claim 11, wherein the sensor is configured to perform in the second operation mode
a measurement of the amplitudes or pulse heights of temperature signals of the first bridge structure, the second bridge structure and/or the third bridge structure.

14. The sensor of claim 1, wherein the sensor comprises a humidity sensor (101) for measuring a relative humidity of the gas and/or a pressure sensor (102) to determine the pressure of the gas surrounding the sensor.

15. The sensor of claim 1, wherein the sensor is configured to use measurements results from the first operation mode to calibrate one or more sensor parameters, in particular drift parameters, of the second operation mode and/or to use measurements results from the second operation mode to calibrate one or more sensor parameters, in particular drift parameters, of the first operation mode.

16. The sensor of claim 1, wherein
the sensor comprises a plurality of second bridge structures (3b, 3d);
each of the plurality of second bridge structures (3b, 3d) comprises a temperature sensor;
at least two of the plurality of second bridge structures are arranged at different distances to the first bridge structure (3a) and/or the third bridge structure (3c); and
the second operation mode is configured to operate the plurality of second bridge structures (3b, 3d) in a sensing mode and to perform a differential measurement of a thermal property of the gas.

17. The sensor of claim 1, wherein the first, the second and/or the third bridge structure comprise
at least a first and a second metal layer (12, 14) separated by at least one dielectric layer (13), wherein said first metal layer (12) forms the heater and said second metal layer (14) forms at least in part the electrodes (30, 31), wherein said first metal layer (12) is in particular a tungsten or platinum or gold layer and wherein said second metal layer (14) is in particular a platinum or gold layer.

18. The sensor of claim 1, wherein the first, the second and/or the third bridge structure (3a, 3b, 3c) comprise, in particular consist of, a central region (5) forming said first, second and third hotplate (6a, 6b, 6c) respectively and two arms (7) extending between said central region (5) and said substrate (1), and in particular wherein a width (D) of said central region (5) is larger than a minimum width (d) of each of said arms (7).

19. The sensor of claim 1, wherein the first operation mode is configured to perform a measurement of the real or imaginary part of the electrical impedance of the first patch.

20. A computer program product for operating a sensor as claimed in claim 1, the computer program product comprising a computer readable non-transitory storage medium having program instructions embodied therewith, the program instructions executable by the sensor to cause the sensor to perform
  in a first operation mode a measurement of an electrical property of the first patch; and
  in a second operation mode a measurement of a thermal property of the gas by the second bridge structure, wherein the thermal property is a thermal capacity and/or a thermal conductivity and/or a thermal diffusivity of the gas.

21. An electronic device, in particular a portable electronic device, comprising a sensor as claimed in claim 1.

22. A method for operating a sensor for detecting and/or analysing a gas, the sensor comprising
  a substrate (1);
  a recess or opening (2) arranged in the substrate (1);
  a first bridge structure (3 a) and a second bridge structure (3 b), extending over said recess or opening (2) and being anchored in the substrate (1);
  wherein
    the first bridge structure (3 a) forms a first hotplate (6a) and comprises
      a first patch (8a) of sensing material, in particular of a metal oxide material, arranged on the first hotplate (6a);
      electrodes (30, 31) adapted to measure an electrical property of the first patch;
      a heater (20) adapted to heat the first hotplate (6a);
    the second bridge structure (3b) comprises at least a temperature sensor (34); and
    the sensor comprises circuitry for driving the heater and for processing signals from the electrodes and the temperature sensor; the method comprising
      performing, in a first operation mode of the sensor, a measurement of an electrical property of the first patch (8a); and
      operating, in a second operation mode of the sensor, the second bridge structure (3b) in a sensing mode to perform a measurement of a thermal property of the gas, wherein the thermal property is a thermal capacity and/or a thermal conductivity and/or a thermal diffusivity of the gas.

23. The method of claim 22, comprising
operating, in the second operation mode, the first hotplate (6a) and/or a hotplate of a third bridge structure in a heating mode to heat the gas; and
measuring, in the second operation mode, a temperature change or one or more temperature parameters as a result of the heating of the first hotplate and/or the hotplate of the third bridge structure;
determining the thermal property of the gas from the temperature change and/or the temperature parameters.

24. The method of claim 22, comprising
performing, in the second operation mode, a non-continuous heating of the first hotplate (6a) and/or the hotplate (6c) of the third bridge structure (3e), in particular a pulsed or sinusoidal heating; and
performing, in the second operation mode, a measurement of one or more temperature parameters of the second bridge structure (3b).

25. The method of claim 24, comprising
performing a measurement of a phase shift between a temperature signal of the first hotplate (6a) and/or the hotplate (6c) of the third bridge structure (3c) and a temperature signal of the second bridge structure (3b).

26. The method of claim 24, comprising
performing a measurement of the amplitudes or pulse heights of temperature signals of the first bridge structure, the second bridge structure and/or the third bridge structure.

* * * * *